No. 674,358. Patented May 14, 1901.
D. C. HASKELL.
LID SUPPORT FOR FRUIT CASES.
(Application filed Feb. 12, 1901.)
(No Model.)
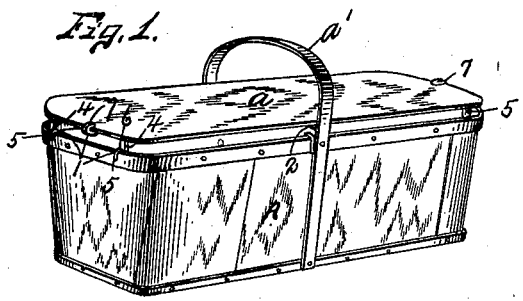
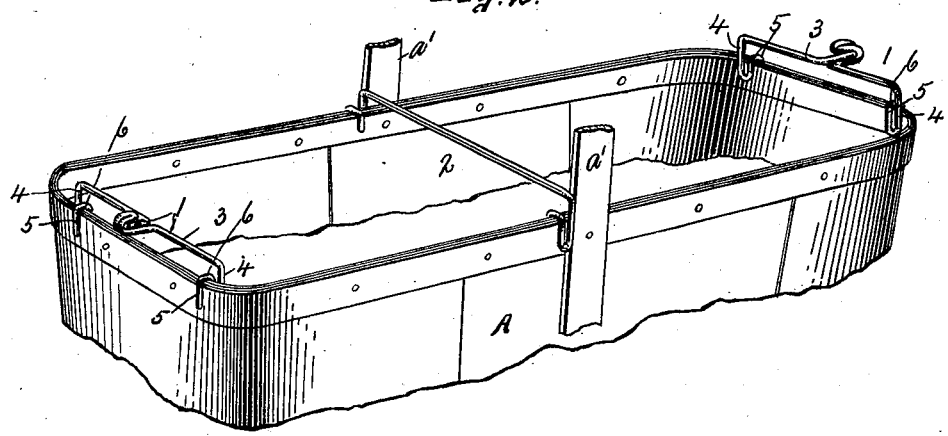
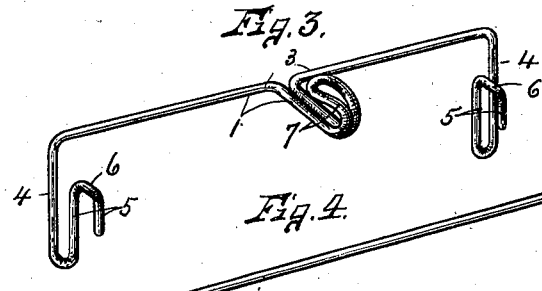
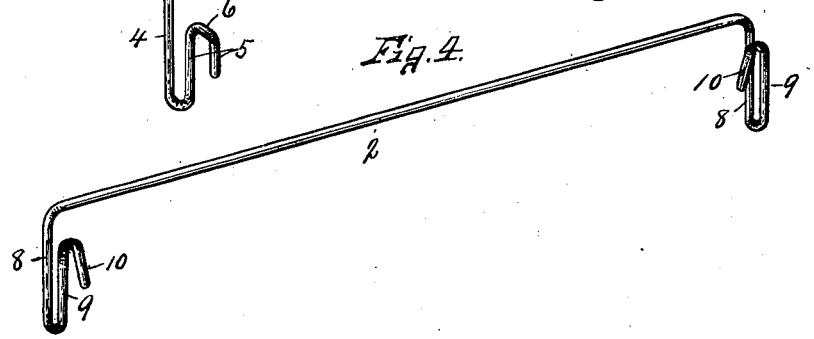
WITNESSES:
INVENTOR
Dana C Haskell
BY
Smith & Duison
ATTORNEYS.

UNITED STATES PATENT OFFICE.

DANA C. HASKELL, OF NORTHEAST, PENNSYLVANIA, ASSIGNOR OF ONE-HALF TO GEORGE H. FERNALD, OF SAME PLACE.

LID-SUPPORT FOR FRUIT-CASES.

SPECIFICATION forming part of Letters Patent No. 674,358, dated May 14, 1901.

Application filed February 12, 1901. Serial No. 46,992. (No model.)

*To all whom it may concern:*

Be it known that I, DANA C. HASKELL, of Northeast, in the county of Erie, in the State of Pennsylvania, have invented new and useful Improvements in Lid-Supports for Fruit-Cases, of which the following, taken in connection with the accompanying drawings, is a full, clear, and exact description.

This invention relates to improvements in lid-supports for fruit-cases, one object being to provide a simple and practical device or devices for supporting the lid in such relation to the fruit-containing receptacle as to admit a free circulation of air to the fruit and to permit the cases to be stored or packed in large quantities one upon the other within a minimum space and without liability of injuring the fruit, either by undue compression or from the exclusion of air.

A further object of this invention is to permit the lids of the receptacles to be readily removed and replaced in operative position when it is desired to inspect the fruit.

To these ends the invention consists in the construction, combination, and arrangement of the parts of a lid-support, as hereinafter fully described, and pointed out in the claims.

Referring to the drawings, Figure 1 is a perspective view of an ordinary fruit-basket equipped with my improved lid-supports. Fig. 2 is an enlarged perspective view of the upper portion of the basket seen in Fig. 1, the lid being removed and the lid-supports being shown in their operative positions. Figs. 3 and 4 are isometric views, respectively, of one of the detached supports for the end of the lid and the detached intermediate support for said lid.

Similar reference characters indicate corresponding parts in all the views.

It is well known that in the transportation or storage of large quantities of fruit and vegetables, and particularly grapes, all of which are usually packed in suitable cases or baskets, a large percentage of the fruit or similar perishable produce is lost by decay or injury, owing to the exclusion of a free circulation of fresh air to said fruit and also by the crushing or undue compression of the fruit incidental to the packing or support of the cases or receptacles one upon the other. Furthermore, in the devices or receptacles now in use it is extremely difficult to remove the lids of said receptacles for the inspection of the contents and then to resecure said lids in position. My invention is designed to obviate these difficulties; and it consists, essentially, of a plurality of lid supports or clamps provided with jaws adapted to be detachably engaged with the upper edges of the receptacle or case, said clamps or supports being provided with engaging faces disposed in a plane above the upper edges of the receptacle for engaging and supporting the lid above said edges of the receptacle.

As seen in the drawings, Figs. 1 and 2, I have shown my invention as applied to an ordinary fruit-basket A, having a removable lid *a;* but it is evident that the same may be used in connection with any other kind of a receptacle in which it is desired to support the lid in a plane above the upper edges of the receptacle.

When my invention is used in connection with a basket or other elongated receptacle, as seen in the drawings, I preferably employ the opposite end supports or clamps 1 and an intermediate support 2, the end supports 1 being detachably mounted upon the opposite ends of the receptacle A for supporting corresponding ends of the lid *a*, and the intermediate support 2 is detachably mounted upon the opposite upper edges of the intermediate portion of the receptacle C in proximity to the handle *a'*, secured to said receptacle.

The end supports 1 each preferably consists of a single bar of metal, usually of spring-wire, having a substantially horizontal intermediate portion 3 and downturned arms 4, the arms 4 being provided with clamping-jaws 5, adapted to engage the upper edges of the end walls of the receptacle A. These clamping-jaws 5 are formed integral with the arms 4 and consist of loops open at their lower ends, the closed end 6 of said loop being adapted to rest upon the upper edges of said receptacle. These loops or jaws 5 are formed of less height than the length of the arms 4 for supporting the bar 3 in a plane above the shoulder or closed ends 6 of the loop or jaws 5.

The intermediate portion of the bar 3 is provided with clamping-jaws 7, which are formed by bending the intermediate portion of the bar 3 laterally upon itself and then bending the looped portion upwardly and backwardly for forming an open-sided loop adapted to receive the adjacent end of the lid for supporting the same in its operative position. These jaws 7 of each of the supports 1 are so arranged as to have their open sides toward each other in order that the lid may be readily inserted therein, the lower jaws and the bar 3 forming a support for preventing the downward movement of the lid and the upper jaws serving to prevent upward displacement of said lid, it being understood that the lid is interposed between the opposite upright ends of the handle $a'$ and that said upright portions of the handle serve to prevent lateral displacement of the lid. It is evident, however, that other means may be employed for preventing lateral displacement of the lid—as, for instance, additional clamps or supports 1 may be secured to the side walls of the receptacle and engaged with the lateral edges of the lid in the same manner as seen in the drawings for engaging the end edges of said lid.

The upright arms 4 and adjacent arms of the jaws 5 are adapted to engage the inner face of the receptacle, the other arm of each of said jaws being adapted to engage or lap upon the outer adjacent face of the said receptacle. It is thus evident that the supports or clamps 1 are provided with separated bearings or stop-shoulders for engaging the upper edges of the end walls of the receptacle, which serve to limit the downward movement of the supports or clamps 1, and that the arms 4 and jaws 5 extend downwardly a sufficient distance upon the inner and outer faces of the end walls of the receptacle to prevent the rocking movement of the supports or clamps and are sufficiently yielding to permit the jaws 7 to be readily disengaged from the end edges of the lid when desired, it being evident that said end walls of the receptacle are also yielding.

The intermediate clamp or support 2 preferably consists of a single bar of metal, such as spring-wire, its intermediate portion being arranged in a substantially horizontal plane and its opposite ends being provided with depending arms 8, having upturned ends 9 and downturned extremities 10, the arms 8 and 9 being adapted to engage the outer faces of the side walls of the receptacle A and the arms 10 being arranged to engage or lap upon the inner face of said side walls. The arm 9 is formed of less length than the arm 8 and together with the arms 10 form suitable clamping-jaws which are arranged to closely fit the upper lateral edges of the receptacle for holding the support from undue displacement. This clamp or support 2 is arranged in close proximity to the upright portions of the handle $a'$, the arms 8 being arranged to engage the lateral faces of said upright portions of the handle $a'$, which additionally supports the clamp 2 from rocking movement. The arms 8 of the clamp 2 are usually formed of substantially the same length as the arms 4 of the clamp 1, the horizontal portions of the clamps 1 and 2 being disposed in substantially the same plane in order that when the lid is placed in position the lower face of said lid will be simultaneously engaged with the upper faces of the horizontal bars of the clamps 1 and 2.

In the operation of my invention when desired to place the lid in operative position said lid is inserted between the upright portions of the handle $a'$ and the opposite ends of said lids are inserted between the clamping-jaws of the supports 1, the intermediate portion of said lid resting upon the intermediate support 2.

When desired to remove the lid for any purpose, one of the clamps 1 of the adjacent end wall of the receptacle is sprung outwardly until the lid is free to be removed upwardly, whereupon said lid may be drawn lengthwise of the receptacle out of engagement with the other jaw.

The operation of my invention will now be readily understood upon reference to the foregoing description and the accompanying drawings, and it will be noted that some change may be made in the detail construction of the clamps or supports without departing from the spirit of my invention.

Having thus fully described my invention, what I claim, and desire to secure by Letters Patent, is—

1. In a fruit-case, the herein-described lid-support comprising a bar having its intermediate portion formed with a laterally-projecting open loop for receiving the edge of the lid and its opposite ends provided with additional loops open at their lower ends for receiving the edges of the receptacle.

2. In a fruit-case, the herein-described lid-support comprising a bar having its intermediate portion formed with a laterally-projecting open loop for receiving the edge of the lid and its opposite ends provided with additional loops open at their lower ends for receiving the edges of the receptacle, the upper ends of the end loops being closed and disposed in a plane beneath the intermediate loop for the purpose set forth.

3. In a receptacle, the herein-described lid-support comprising a single bar of wire, or its equivalent, having its intermediate portion bent laterally upon itself and then rebent into the form of a hook or loop, and its opposite ends bent downwardly then upwardly and then downwardly for forming additional loops or hooks.

4. In a receptacle, the herein-described lid-support comprising a single bar of wire, or its equivalent, having its intermediate portion bent laterally upon itself and then rebent into the form of a hook or loop, and its opposite ends bent downwardly and upwardly and then downwardly for forming additional loops or hooks, said latter loops or hooks having their closed upper ends disposed in a plane beneath the intermediate loop for the purpose set forth.

5. In a fruit-case, the combination with an open receptacle having a removable lid, and a lid-support consisting of a transverse bar having its opposite ends provided with clamping-jaws detachably engaged with the opposite edges of the receptacle for the purpose specified.

6. In a fruit-case, the combination with an open receptacle having a removable lid, and a lid-support having separated depending arms provided with jaws for engaging opposite edges of the receptacle for the purpose set forth.

7. In a fruit-case, the combination with an open receptacle having a removable lid, and a lid-support consisting of a transverse bar having depending arms provided with loops open at their lower ends for receiving the opposite edges of the receptacle.

8. In a fruit-case, the combination with an open receptacle having a removable lid, and a lid-support consisting of a transverse bar having depending arms provided with loops open at their lower ends for receiving the opposite edges of the receptacle, the closed upper ends of the loops being disposed in a plane beneath the intermediate portion of the bar for the purpose described.

9. The herein-described lid-support comprising a bar of wire or equivalent material having its opposite ends bent downwardly then upwardly, and then downwardly for forming loops for receiving the opposite ends of the receptacle.

10. The herein-described lid-support comprising a bar of wire or equivalent material having its opposite ends bent downwardly then upwardly, and then downwardly for forming loops for receiving the opposite ends of the receptacle, the upper closed ends of said loops being disposed in a plane beneath the intermediate portion of the bar for the purpose specified.

11. A fruit-case comprising an open receptacle having a removable lid and upright shoulders secured to the side walls of the receptacle, lid-supports each having separated clamping-jaws detachably engaging the upper end edges of the receptacle, said supports being also provided with intermediate jaws in a plane above the former jaws for engaging and supporting the end edges of the lid, and an additional support between the former supports and having its intermediate portion engaged with the lower face of the intermediate portion of the lid and its opposite ends provided with depending arms having jaws engaged with the upper edges of the receptacle, said depending arms being adapted to engage the upright shoulders of the receptacle for the purpose set forth.

In witness whereof I have hereunto set my hand this 6th day of February, 1901.

DANA C. HASKELL.

Witnesses:
W. H. ULRICH,
G. A. HAMPSON.